United States Patent [19]

Janssen et al.

[11] Patent Number: 4,660,314
[45] Date of Patent: Apr. 28, 1987

[54] HOOK SNELLER AND LINE CUTTER

[76] Inventors: Owen R. Janssen, Rte. 1, Box 117, Yamhill, Oreg. 97148; George Spector, 233 Broadway Rm 3615, New York, N.Y. 10007

[21] Appl. No.: 822,606
[22] Filed: Jan. 27, 1986
[51] Int. Cl.⁴ .................. A01K 97/06; D04G 5/00
[52] U.S. Cl. ........................................ 43/4; 43/1; 289/17
[58] Field of Search ............... 43/1, 4; 269/6; 289/17

[56] References Cited

U.S. PATENT DOCUMENTS

| | | | |
|---|---|---|---|
| 1,514,010 | 11/1924 | Peck | 289/17 |
| 2,601,605 | 6/1952 | Fulvio | 43/1 |
| 2,700,840 | 2/1955 | Butts | 43/1 |
| 2,926,036 | 2/1960 | Wimberley | 289/17 |
| 2,934,369 | 4/1960 | Kennedy | 289/17 |
| 3,043,615 | 7/1962 | Dannebaum | 43/1 |
| 3,265,422 | 8/1966 | Pierce | 289/17 |
| 4,188,052 | 2/1980 | Browning | 289/17 |

Primary Examiner—Nicholas P. Godici
Assistant Examiner—Kurt Rowan

[57] ABSTRACT

A fish hook sneller and line cutter tool for forming a knot from a fishing line on a fish hook and cutting the fishing line is provided and consists of an elongated housing in a size approximating that of a pen/pencil having a sneller mechanism at one end and a line cutter incorporated within a clip on the housing.

4 Claims, 25 Drawing Figures

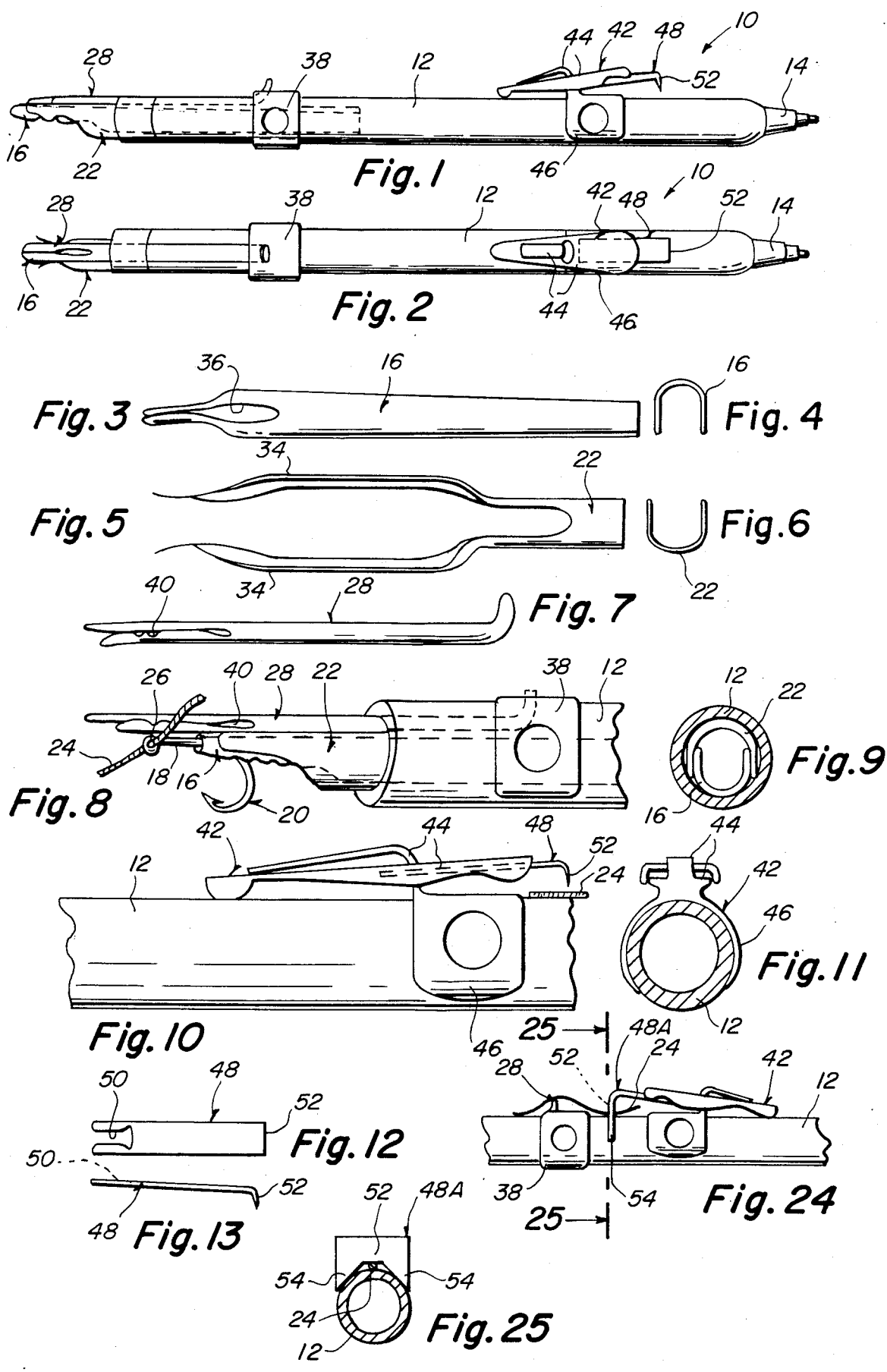

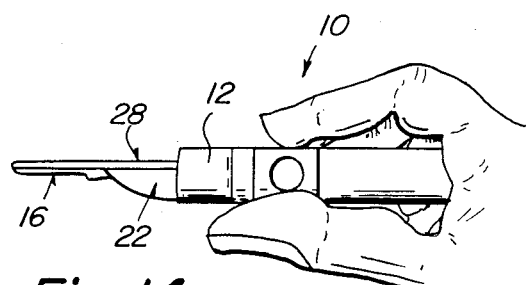
Fig. 14
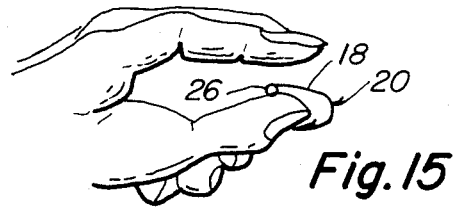
Fig. 15
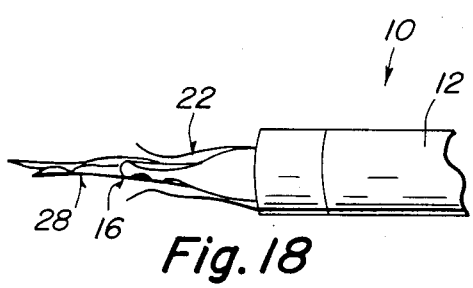
Fig. 16
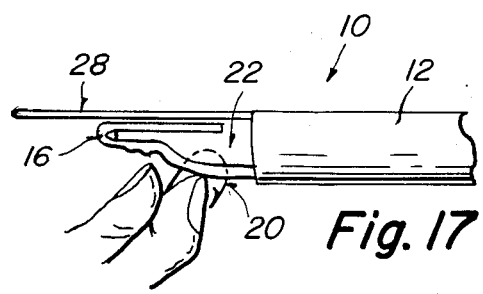
Fig. 17
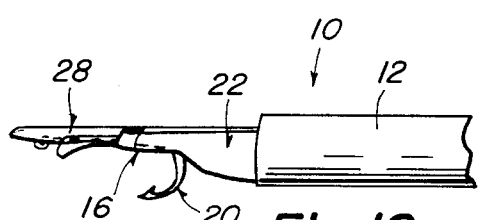
Fig. 18
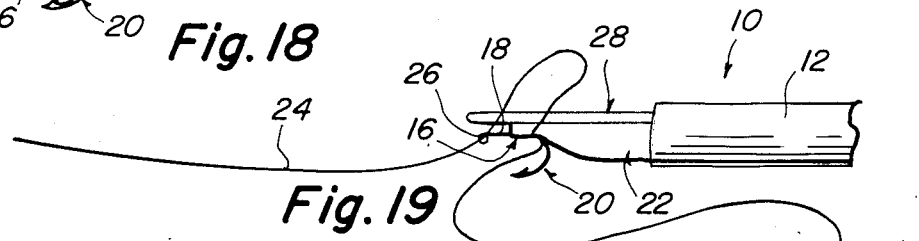
Fig. 19
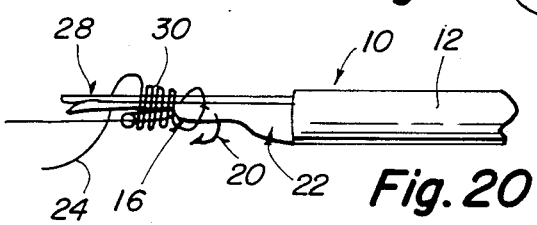
Fig. 20
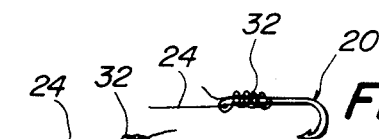
Fig. 21
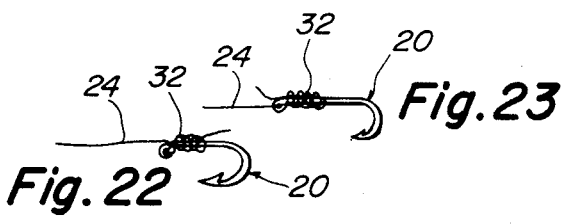
Fig. 22
Fig. 23

HOOK SNELLER AND LINE CUTTER

BACKGROUND OF THE INVENTION

The instant invention relates generally to fishing tools and more specifically it relates to a fish hook sneller and line cutter tool.

Numerous fishing tools have been provided in prior art that are adapted to hold fish hooks so that fishing lines can be attached to the fish hooks. For example, U.S. Pat. Nos. 2,601,605; 3,588,078 and 3,965,605 all are illustrative of such prior art. While these units may be suitable for the particular purpose to which they address, they would not be as suitable for the purposes of the present invention as heretofore described.

SUMMARY OF THE INVENTION

A principle object of the present invention is to provide a fish hook sneller and line cutter tool that can snell a fish hook and cutter line in the simplest and most hassel free way possible.

Another object is to provide a fish hook sneller and line cutter tool that is one complete tool so that a person can start and finish snelling a fish hook and cutting a line without bothering to reach for any other tools.

An additional object is to provide a fish hook sneller and line cutter tool that is light and portable so that it can be carried to any area for use.

A further object is to provide a fish hook sneller and line cutter tool that is simple and easy to use.

A still further object is to provide a fish hook sneller and line cutter tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of the invention.
FIG. 2 is a top view of FIG. 1.
FIG. 3 is a top view of the hook holder.
FIG. 4 is an end view of FIG. 3.
FIG. 5 is a top view of the line holder.
FIG. 6 is an end view of FIG. 5.
FIG. 7 is a side view of the line clamp.
FIG. 8 is an enlarged side view of the tool end.
FIG. 9 is a cross sectional end view of FIG. 8.
FIG. 10 is an enlarged side view of the cutting adapter with clip.
FIG. 11 is a cross sectional end view of FIG. 10.
FIG. 12 is a top view of the cutting adapter.
FIG. 13 is a side view of FIG. 12.
FIGS. 14 to 23 are various steps to utilize the tool.
FIG. 24 is a side view with parts broken away of a modification whereby the cutting adapter is turned around and placed adjacent the clamp portion of the line clamp.
FIG. 25 is a cross sectional view taken along line 25—25 in FIG. 24 showing a flexible guide extending downwardly from the bent cutting edge to hold free end of the line for cutting.

DETAILED DESCRIPTION OF THE PREFERRED EMBODIMENTS

Turning now descriptively to the drawings, in which similar reference characters denote similar elements throughout the several views, FIGS. 1 through 25 illustrates a fish hook sneller and line cutter tool 10 that consists of an elongated housing 12 in a size approximating that of a pen/pencil 14.

A hook holder 16 extends forwardly from the housing 12 and is adapted to hold a shank 18 of a fish hook 20 therein. A line holder 22 extends forwardly from the housing 12 and is adapted to hold a portion of a line 24 after free end of the line is threaded through an eye 26 of the fish hook 20.

The line clamp 28 slideably extends forwardly from the housing 12. The free end of the line 24 is wrapped around the shank 18 of the fish hook 20 and the line clamp 28 in coiled bights 30. The line clamp 28 is adapted to hold the free end of the line 24 for passing the free end through the bights 30 upon rearwardly sliding the line clamp 28 thereby forming a knot 32 upon forward removal of the fish hook 20 from the tool 10.

The line holder 22 has a pair of flexible arms 34, 34 (see FIG. 5) and the hook holder 16 has a slot 36 (see FIG. 3) therein. The hook holder 16 is placed within the line holder 22 in which both extend forwardly from the housing 12. The arms 34, 34 will apply pressure to the hook holder 16 to squeeze the slot 36 of the hook holder. Each of the arms 34, 34 are adapted to properly hold the line 24 while the slot 36 of the hook holder 16 is adapted to properly hold the shank 18 of the fish hook 20 therein.

The line clamp 28, as best seen in FIG. 8, includes a clamp portion 38 at one end for rearwardly sliding the line clamp on the housing 12. The line clamp 28 has a slot 40 at other end for holding the free end of the line 24.

The tool 10 further contains a clip member 42 that has a spring tension portion 44 and a clamp portion for securement to the housing 12.

A cutting adapter 48 is provided and has a slot 50 at one end and a bent cutting edge 52 at other end. The slot 50 will engage the tension portion 44 of the clip member 42. The line 24 can be cut by placing the line between the cutting edge 52 of the cutting adapter 48 and the housing 12. Manually pressing down the cutting adapter 48 will cut the line 28.

In referring to FIGS. 24 and 25 a modified cutting adapter 48A is shown. The clip member 42 and cutting adapter 48A are turned around and placed adjacent to the clamp portion 38 of the line clamp 28 on the housing 12. A pair of flexible guides 54 each extending downwardly from one side of the bent cutting edge 52 to position the free end of the line 24 against the housing 12 for cutting.

While certain novel features of this invention have been shown and described and arm pointed out in the annexed claims, it will be understood that various omissions, substitutions and changes in the forms and details of the device illustrated and in its operation can be made by those skilled in the art without departing from the spirit of the invention.

What is claimed is:

1. A fish hook sneller and line cutter tool which comprises:

(a) an elongated housing;
(b) a hook holder extending forwardly from said housing and adapted to hold a shank of a fish hook therein;
(c) a line holder extending forwardly from said housing and adapted to hold a portion of a line after free end of said line is threaded through an eye of said fish hook;
(d) a line clamp slideably extending forwardly from said housing whereby said free end of said line is wrapped around said shank of said fish hook and said line clamp in coiled bights with said line clamp adapted to hold said free end of said line for passing said free end through said bights upon rearwardly sliding said line clamp thereby forming a knot upon forward removal of said fish hook from said tool;
(e) said line holder having a pair of flexible arms; and
(f) said hook holder having a slot therein, said hook holder placed within said line holder in which both extend forwardly from said housing so that said arms will apply pressure to said hook holder to squeeze said slot of said hook holder, each of said arms adapted to properly hold said line while said slot of said hook holder adapted to properly hold said shank of said fish hook therein.

2. A fish hook sneller and line cutter tool as recited in claim 1, wherein said line clamp further includes a clamp portion at one end for rearwardly sliding said line clamp on said housing and said line clamp having a slot at other end for holding said free end of said line.

3. A fish hook sneller and line cutter tool as recited in claim 2, further comprising:
(a) a clip member having a spring tension portion and a clamp portion for securement to said housing; and
(b) a cutting adaptor having a slot at one end and a bent cutting edge at other end in which said slot will engage said tension portion of said clip member so that said line can be cut by placing said line between said cutting edge of said cutting adapter and said housing and manually pressing down said cutting adapter to cut said line.

4. A fish hook sneller and line cutter tool as recited in claim 3, wherein said clip member and said cutting adapter are turned around and placed adjacent to said clamp portion of said line clamp on said housing, said cutting adapter further comprising a pair of flexible guides, each extending downwardly from one side of said bent cutting edge to position said free end of said line against said housing for cutting.

* * * * *